United States Patent [19]

Bouteiller

[11] Patent Number: 5,605,727
[45] Date of Patent: Feb. 25, 1997

[54] METHOD FOR OBTAINING COMPOSITE MATERIALS BASED ON CROSS-LINKED POLYMER AND FLUID MOLECULES, COMPRISING A STEP OF DRYING IN SUPERCRITICAL PHASE

[75] Inventor: Laurent Bouteiller, Massy, France

[73] Assignee: Thomson-CSF, Paris, France

[21] Appl. No.: 475,942

[22] Filed: Jun. 7, 1995

[30] Foreign Application Priority Data

Jun. 21, 1994 [FR] France ................... 94 07572

[51] Int. Cl.$^6$ ..................... G07F 1/13
[52] U.S. Cl. ................... 428/1; 521/63; 521/64; 264/1.34; 264/1.38; 264/1.7; 252/299.01; 430/20; 349/89
[58] Field of Search .................. 428/1; 521/63, 521/64; 264/1.34, 1.38, 1.7, 41; 359/51, 52; 252/299.01; 430/20

[56] References Cited

U.S. PATENT DOCUMENTS

| | | | |
|---|---|---|---|
| 5,268,783 | 12/1993 | Yoshinaga et al. | 359/103 |
| 5,422,377 | 6/1995 | Aubert | 521/64 |
| 5,430,563 | 7/1995 | Bouteiller et al. | 359/51 |
| 5,475,515 | 12/1995 | Yoshinaga et al. | 359/52 |

FOREIGN PATENT DOCUMENTS

| | | |
|---|---|---|
| 0357234 | 3/1990 | European Pat. Off. . |
| 0507204 | 10/1992 | European Pat. Off. . |
| 0512397 | 11/1992 | European Pat. Off. . |
| 0612827 | 8/1994 | European Pat. Off. . |
| 0619360 | 10/1994 | European Pat. Off. . |
| 2258318 | 2/1993 | United Kingdom . |
| WO91/13126 | 9/1991 | WIPO . |
| WO92/12219 | 7/1992 | WIPO . |

*Primary Examiner*—Mark Nagumo
*Attorney, Agent, or Firm*—Oblon, Spivak, McClelland, Maier & Neustadt, P.C.

[57] ABSTRACT

Disclosed is a method for obtaining composite material comprising a network of cross-linked polymer and fluid molecules. Such materials, using molecules of liquid crystal, are notably used in display screens. The originality of the disclosure lies in the drying, in supercritical phase, of the molecules that have enabled the preparation of the network. Generally, the operation of evaporation drying of the solvent leads to a deterioration of the network structure. With the method according to the invention, the network keeps its initial structure, making it possible to obtain high performance characteristics in scattering of light. Application to display screens and protection for detectors.

No abstract figure.

9 Claims, 4 Drawing Sheets

METHOD FOR OBTAINING COMPOSITE MATERIALS BASED ON CROSS-LINKED POLYMER AND FLUID MOLECULES, COMPRISING A STEP OF DRYING IN SUPERCRITICAL PHASE

BACKGROUND OF THE INVENTION

1. Field of the Invention

The field of the invention particularly is that of display screens and more generally that of devices using composite materials capable of passing from a transparent or scattering state to a scattering or transparent state respectively under the effect of an electrical or optical command.

In the case of display screens made with polymer/liquid crystal components capable of containing dichroic dyes, the effect brought into play is an electro-optical effect: generally, a film of a composite material formed by polymer and dyed liquid crystal is contained between two transparent conductive electrodes. The dyed liquid crystal is obtained by the dilution of dyeing molecules between liquid crystal molecules. At rest, without voltage, the film is a scattering film owing to the differences in refractive index between the polymer and liquid crystal and is furthermore absorbent because of the molecules of dye whose orientation, dictated by that of the liquid crystal, varies randomly from one domain to another. The application of a voltage to the terminals of this film causes the molecules of liquid crystal to get oriented with the molecules of dye chosen so as to be dichroic, in parallel to the electrical field applied. By working firstly with a liquid crystal whose ordinary index is equal to that of the polymer (there is no scattering at the interface between the polymer and the liquid crystal) and secondly with a dichroic dye that is no longer absorbent, a transparent film is obtained under an electrical field. Such a film is therefore capable of providing two states, a scattering and absorbent state and a non-absorbent, transparent state. The contrast obtained with such composite materials is far more satisfactory than the one proposed with composites containing no dichroic dyes and having only one scattering state and one transparent state.

Furthermore, the use of composite material formed by polymer and dyed liquid crystal offers many advantages as compared with other display techniques using, in particular, liquid crystal cells. Indeed, these composites:

- enjoy the advantage of ease of implementation of the polymers which makes it possible to deposit them easily in thin films having a controlled thickness on large surface areas;
- do not require any surface treatment of the substrates forming the screen;
- work without any polarizer (whence a substantial gain in luminosity);
- show an electro-optical effect with a viewing angle of the order of 150°.

2. Description of the Prior Art

Nevertheless, at the present time, the techniques for the implementation of these compounds are not satisfactory, especially because of remaining impurities.

Indeed, the main method used to obtain composite materials formed by liquid crystals and polymer is the method of phase separation induced by polymerization. This method consists in making a homogeneous mixture of a liquid crystal and a monomer and then polymerizing it (thermally or photochemically). The polymer that forms becomes insoluble in liquid crystal and separates therefrom.

Consequently, the fluid phase of the composite material contains chiefly liquid crystal but also monomer, fragments of initiator and trapped free radicals. On the one hand, these impurities reduce the resistivity of the material and therefore reduce the time constant of the capacitor formed by the composite material introduced between the two electrodes. On the other hand, the residual free radicals induce substantial ageing in the cell. It is therefore important to be able to purify the composite material thus obtained by withdrawing the fluid phase and then introducing a clean mixture of liquid crystal capable of containing dichroic dye.

Furthermore, the introduction of dyes cannot be done directly because they get deteriorated by the free radicals.

For these two reasons, it may be worthwhile to replace the liquid crystal used for making the composite material by a clean liquid crystal (capable of containing a dye): a first technique (K. Takenchi, Y. Umezu, H. Takatsu, 17th Japan LC Conference 108, September 1991) consists in opening the cell and washing the liquid crystal with a solvent.

It is also possible to bring about the diffusion of the solvent without opening the cell and then to evaporate this solvent.

The invention is based on the fact that the different approaches used to empty the polymer network affect this network whose porosity deteriorates during the elimination of the solvent. Indeed, when the liquid evaporates within the pores of the polymer, there is created a liquid/gas interface where forces due to the surface tension of the liquid are exerted. The sum of these forces has the effect of destroying the network. This deterioration then affects the properties of the liquid crystal/polymer composite material obtained after a new introduction of liquid crystal into the polymer network that has been washed beforehand.

The same type of problem may also arise in the "optical limiter" devices used to attenuate high power light beams capable of damaging optical systems. Indeed, to obtain the protection of detector type optical systems, it may be advantageous to integrate composite materials into these systems, these composite materials comprising a porous network of polymer in which there are included molecules whose refractive index may vary greatly under the effect of an intense light beam. By making a judicious choice of the molecules that initially have a refraction index equal to that of the polymer and a refraction index that is therefore appreciably different under high radiation, it is thus possible to go from a transparent state to a scattering state by optical control.

The molecules introduced may typically be of the $CS_2$ type. Since these molecules have to be inserted into the polymer network, they could, in this respect, be formed by means of an initial liquid crystal $(\chi^L)_o$ as in the preparation of the composite material for a display screen.

SUMMARY OF THE INVENTION

In order to resolve this general problem, the invention proposes a method for obtaining composite materials based on polymer and fluid molecules in which the withdrawal of the fluid phase is done without disturbing the polymer. More specifically, an object of the invention is a method for obtaining composite material comprising a cross-linked polymer P, fluid molecules m, wherein said method comprises the following steps:

- the making of a porous film F of cross-linked polymer comprising liquid crystal $(\chi^L)_o$ within the pores;
- the immersion of said film in a solvent S of liquid crystal $(\chi^L)_o$ to dissolve said liquid crystal;

the drying of said film under temperature and pressure conditions that are close to the supercritical phase or are in the supercritical phase;

the filling of the dried film by molecules m.

The method according to the invention may advantageously comprise several steps of dissolving with different solvents. This may be the case when it is not easy to combine, on the one hand, the functions of a good solvent of liquid crystal with, on the other hand, easily accessible values of critical temperature and critical pressure.

In the method for obtaining composite materials according to the invention, the drying operation close to or in the supercritical phase, namely beyond the point C having coordinates Tc, Pc in the state graph of FIG. 1, enables the continuous passage from the liquid state to the gas state and the positioning of the operation in a single fluid phase, making it possible to overcome the problems caused by the liquid/gas interface of the solvent incorporated in the polymer network. Indeed, the surface tension of the solvent in the pores tends to crush the polymer network. It is furthermore possible to choose the conditions of maximum pressure and temperature reached during the drying cycle to optimize the solubilizing capacity of the supercritical fluid (solvent).

In the context of a display screen, the molecules m may be liquid crystal molecules ($\chi^L$). In the context of the optical limiter, these molecules m may be molecules of the type having a highly non-linear refractive index.

BRIEF DESCRIPTION OF THE DRAWINGS

The invention will be understood more clearly and other advantages shall appear from the following description and the appended figures of which.

MORE DETAILED DESCRIPTION

The invention shall be described more specifically in the context of the making of composite material formed by polymer and liquid crystal. However, the scope of the invention may be broadened, provided that a porous film of cross-linked polymer is filled with fluid molecules.

To implement the method of the invention for obtaining a composite material formed by polymer and liquid crystal, it is necessary initially to make a first polymer film containing liquid crystal $(\chi^L)_o$, said liquid crystal enabling the creation of a porosity capable of receiving the desired final liquid crystal $(\chi^L)$ or a mixture of liquid crystal $(\chi^L)$ and dichroic dye.

For this purpose, it is possible, using a mixture of monomer, photo-initiator and liquid crystal, to obtain a polymer with variable porosity depending on the concentrations of the different initial entities.

Such a mixture may advantageously be introduced by capillarity into a cell formed beforehand by two transparent conductive substrates (it may be a plate of transparent material covered with a thin conductive layer of indium-tin oxide) and shims having a known and controlled thickness. The cell thus prepared and filled may be irradiated by ultraviolet radiation. There is then obtained a cross-linked network of polymer containing inclusions of liquid crystal $(\chi^L)_o$. The cell may then be submerged in a great volume of solvent S of the liquid crystal, thereby enabling the selective dissolving of the liquid crystal through the porous network of polymer.

Since the standard solvents of the liquid crystals generally have a critical temperature greater than about 190° C., this temperature causing the deterioration of the polymer network, it may be advantageous to operate in two stages as illustrated by the following exemplary method.

A cell made beforehand according to the method described, containing a polymer network in which liquid crystal $(\chi^L)_o$ is dispersed, is immersed in ether which is a solvent S of liquid crystal. In a second stage, the cell is put into contact with a second solvent S' that replaces the solvent S within the cell and shall be dried in a quasi-supercritical or supercritical phase.

For this purpose, the cell is cooled to −78° C., the temperature at which carbon dioxide $CO_2$, the solvent S', is in the solid state Thus, the cell cooled in the presence of dry ice (solid $CO_2$) is introduced into an autoclave. More specifically, 150 grams of dry ice are introduced into an autoclave with a volume of 300 ml. It is important to put a sufficient quantity of dry ice into a given volume so as to always keep a sufficient amount of liquid $CO_2$ in relation to gaseous $CO_2$ during the heating of the entire batch. Indeed, the curve of FIG. 2 illustrates the thermodynamic path followed during the stage of evaporation of solvent S'.

Figure 1:
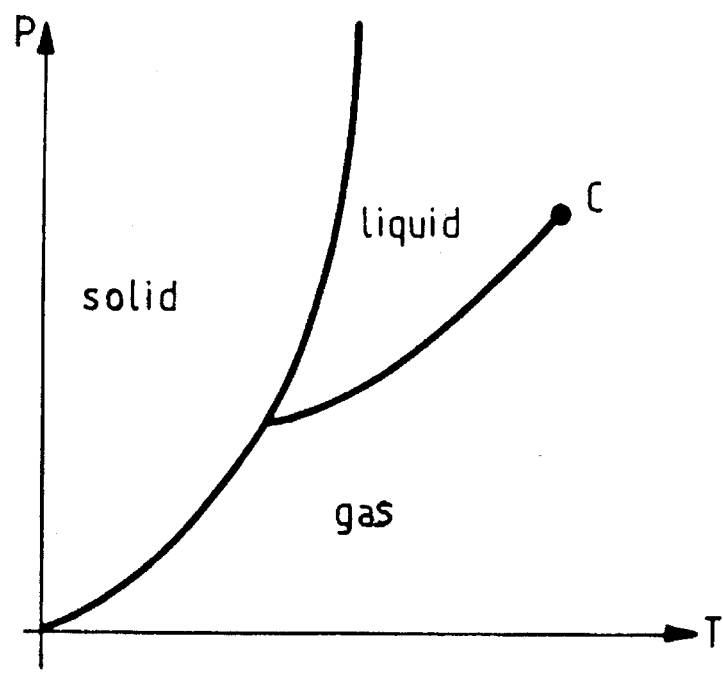
FIG. 1 shows a state graph corresponding to the three states (solid, liquid, gas) as a function of the temperature and pressure.
Figure 2:
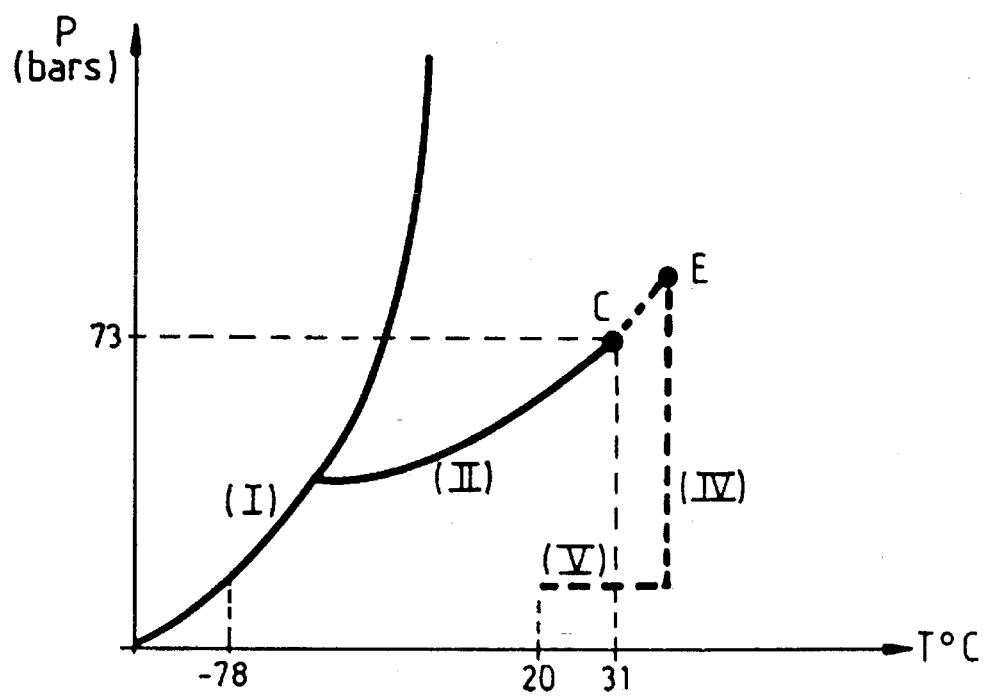
FIG. 2 shows the state graph of carbon dioxide used in an exemplary method according to the invention to make a polymer network containing liquid crystal.

The autoclave is then continually heated so as to move along the curve (I) of FIG. 2 and then along the curve (II) to reach the point C of the carbon dioxide ($T_c$=31° C., $P_c$=73 bars) and even go beyond it. Thus, a final state is reached corresponding to the point E (The=40° C., Pe=100 bars). From the point E onwards, the temperature Te is kept while at the same time decompression is carried out so that there is a gradual return to atmospheric conditions, in a first stage by a return to ambient pressure (path IV) and then in a second stage by a cooling down to ambient temperature (path V).

The drying in supercritical phase of the carbon dioxide makes it possible to keep the porous structure of the polymer network, unlike in the standard method of evaporation of the solvent of the liquid crystal.

Figure 3:
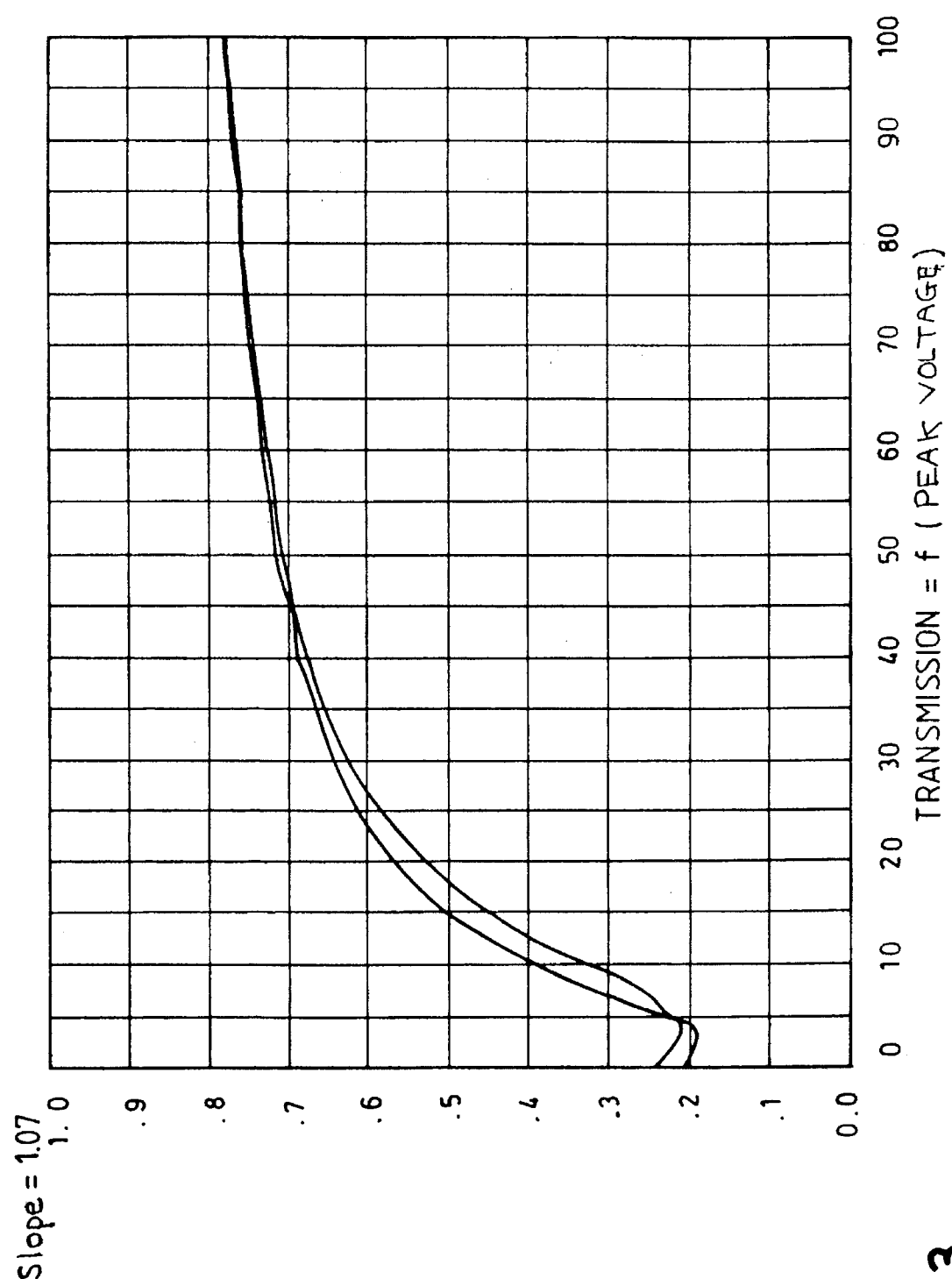
FIG. 3 illustrates the performance characteristics of an exemplary composite material obtained according to a prior art method, relating to the progress of the transmission of a cell containing the composite material as a function of the voltage applied to said cell.

To validate this concept, composite cells emptied of their liquid crystal $(\chi^L)_o$ and then filled with clean liquid crystal $(\chi^L)$ introduced by capillarity have been assessed in transmission as a function of the voltage. Indeed, the application of a voltage to this type of cell makes it possible to go from a scattering state to a transparent state. However, in the case of a solvent that is dried in a standard way, the porous network collapses and is confined in a part of the cell during the filling of this cell, the liquid crystal is confined for the most part above the polymer, the entire polymer and liquid crystal loses in terms of scattering capacity since the network configuration of the polymer and of the crystal inclusions has deteriorated, as is illustrated in FIG. 3.

Figure 4:
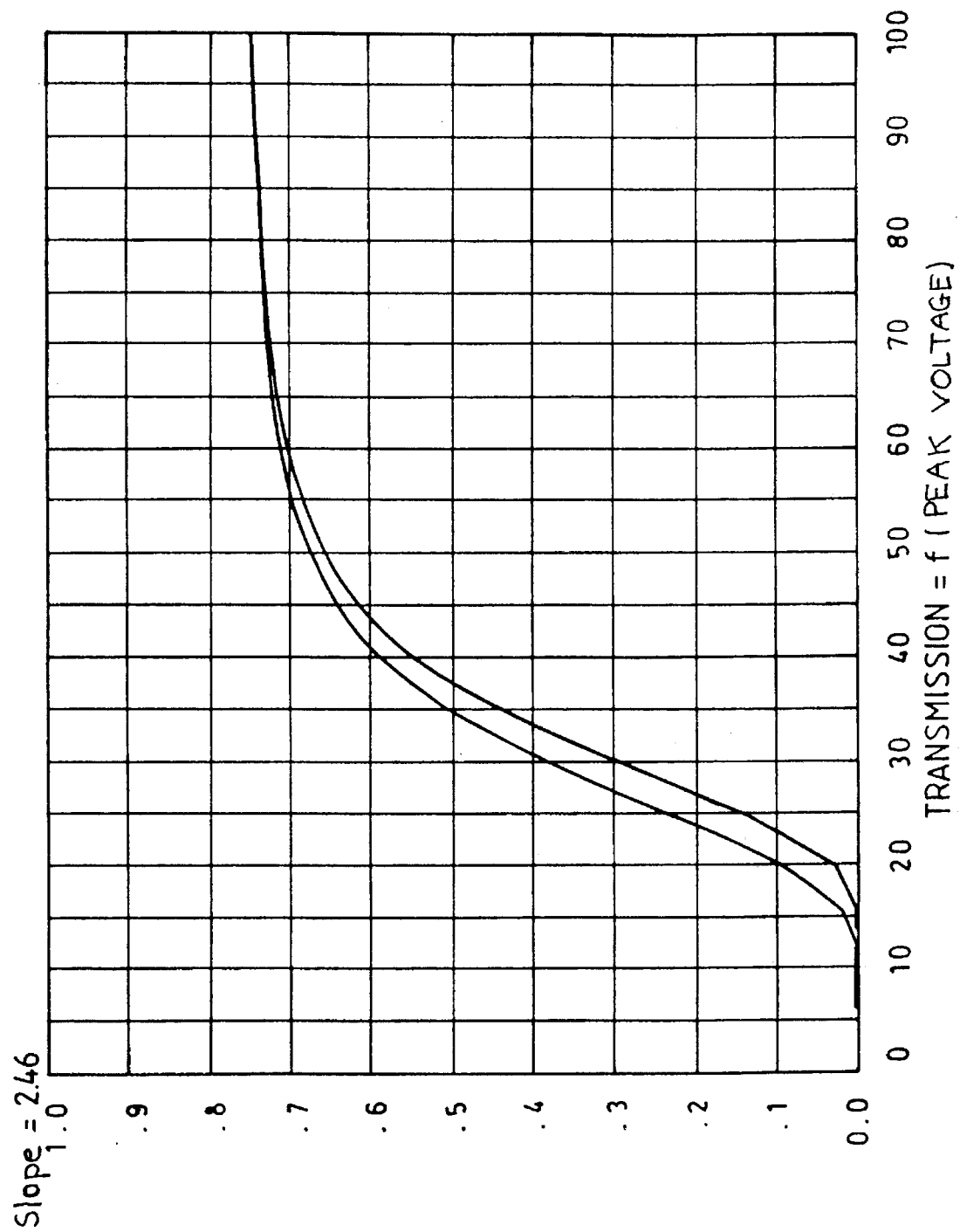
FIG. 4 illustrates the performance characteristics of an exemplary composite material obtained according to the method of the invention, relating to the progress of the transmission of a cell containing the composite material as a function of the voltage applied to said cell.
Figure 5:
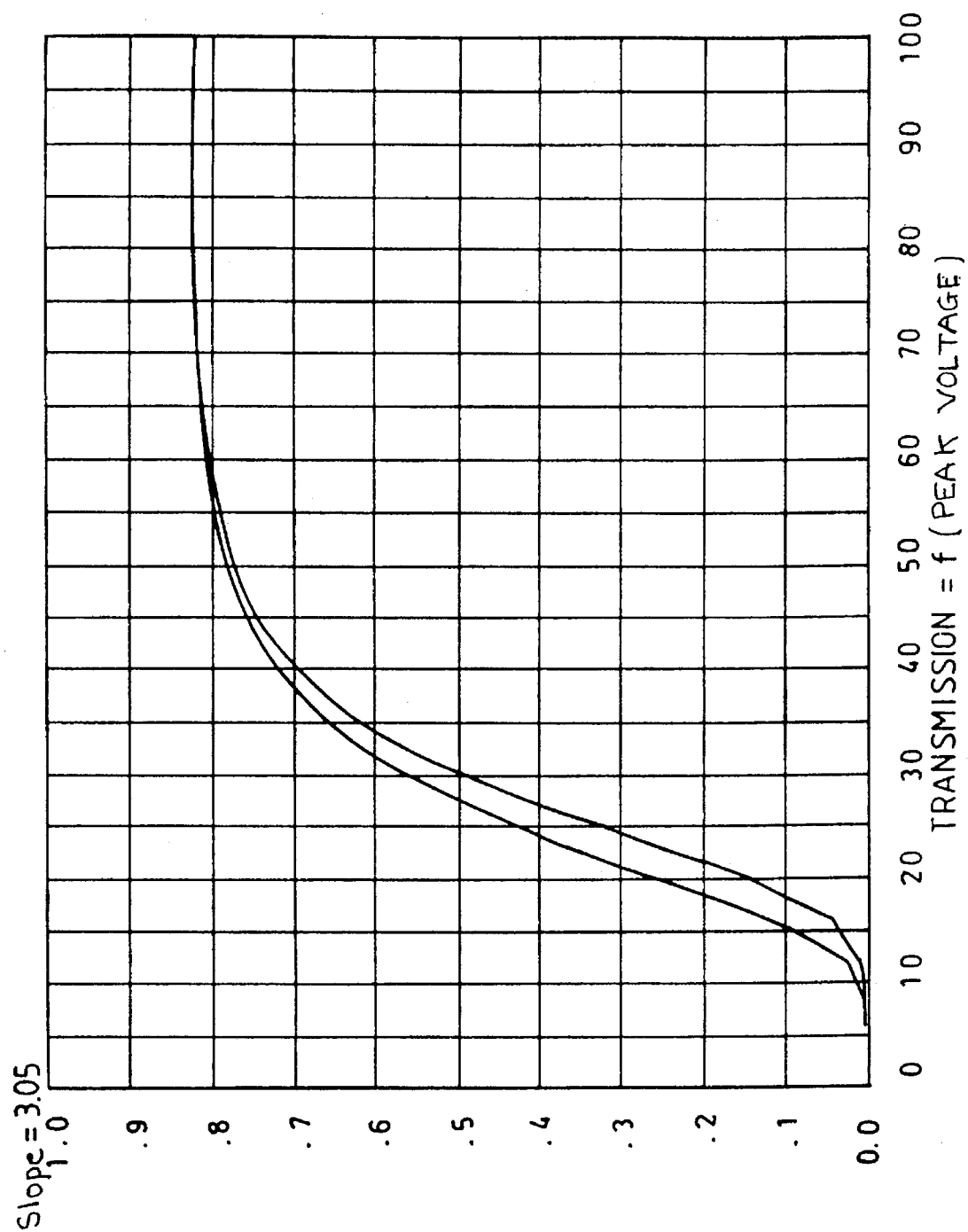
FIG. 5 illustrates the same type of curve as those shown in FIGS. 3 and 4 for a composite material formed by a network of an polymer/initial liquid crystal $(\chi^L)_o$, hence before the withdrawal of liquid crystal and the drying of the solvent.

FIG. 4 shows a high contrast between the transparent state under voltage indicating efficient qualities of dispersion of the cell. This curve must above all be compared with that of FIG. 5, recorded on a cell containing a porous network with inclusions of liquid crystal $(\chi^L)_o$, hence before the phase of drying in a supercritical phase. The comparison of these two curves indicates the preservation of the porosity of the polymer network despite the step for the drying of the solvent.

It may be noted that, since the liquid crystal is withdrawn and since the polymer network is preserved, it may be especially valuable to modify reactive functions (Y) of the polymer which are in contact with the pores and therefore with the liquid crystal molecules $(\chi^L)$. The chemical transformation of such functions into functions (X) leads to the preparing of a porous network of polymer having chemical functions (Y) and, at the polymer/liquid crystal interface, (X) chemical functions. The combination of the parameters (X) and (Y) makes it possible to optimize the performance characteristics obtained with the composite material (notably characteristics of contrast, control voltage, etc.). Typically, the chemical transformation of the functions (Y) into functions (X) may be done in the presence of a gas comprising functions (Z) capable of generating functions (X). For example, the functions (Y) may be alcohols and the functions (Z) may be acid chlorides.

What is claimed is:

1. A method for obtaining composite material comprising a cross-linked polymer (P), fluid molecules (m), wherein said method comprises the following steps:

the making of a porous film (F) of cross-linked polymer comprising liquid crystal $(\chi^L)_o$ within the pores;

the immersion of said film in a solvent (S) of liquid crystal $(\chi^L)_o$ to dissolve said liquid crystal;

the drying of said film under temperature $(T_E)$ and pressure $(P_E)$ conditions that are at least in the supercritical phase;

the filling of the dried film with molecules (m).

2. A method for obtaining composite material according to claim 1, wherein the porous film (F) of cross-linked polymer is obtained from a mixture $(M)_o$ of photopolymerizable monomer, photo-initiator and liquid crystal $(\chi^L)_o$.

3. A method for obtaining composite material according to claim 1, comprising a second immersion of the porous film of polymer in a solvent (S') whose critical pressure and critical temperature are closer to the pressure and temperature of the ambient atmosphere.

4. A method for obtaining composite material according to claim 3, wherein the solvent (S') is carbon dioxide.

5. A method for obtaining composite material according to claim 1, wherein the pressure $P_E$ and the temperature $T_E$ are chosen to optimise the solubilizing capacity of the solvent (S).

6. A method for obtaining composite material according to claim 1 comprising, after the drying, in at least supercritical phase, of a porous film of polymer possessing reactive functions (Y), the chemical transformation of these reactive functions (Y) of the polymer chains located at the interface between the polymer and the pores of the network, so as to obtain a network having, in volume, polymer chains having functions (Y) and, on the surface, polymer chains having functions (X).

7. A method for obtaining composite material according to claim 1, wherein the molecules (m) are liquid crystal molecules.

8. A method for obtaining composite material according to claim 7 comprising, after the step for the drying of the film in at least the supercritical phase, the filling of the pores of the network with a mixture of liquid crystal $(\chi^L)$ and dichroic dye.

9. A method for obtaining a composite material according to claim 1, wherein the molecules (m) are molecules whose refraction index varies under illumination.

* * * * *